(12) United States Patent
Beard et al.

(10) Patent No.: US 10,169,205 B2
(45) Date of Patent: Jan. 1, 2019

(54) AUTOMATED SYSTEM TESTING IN A COMPLEX SOFTWARE ENVIRONMENT

(71) Applicant: INTERNATIONAL BUSINESS MACHINES CORPORATION, Armonk, NY (US)

(72) Inventors: Darren R. Beard, Hampshire (GB); Jenny J. He, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/370,219

(22) Filed: Dec. 6, 2016

(65) Prior Publication Data

US 2018/0157581 A1    Jun. 7, 2018

(51) Int. Cl.
*G06F 9/44* (2018.01)
*G06F 11/36* (2006.01)

(52) U.S. Cl.
CPC ........ *G06F 11/3664* (2013.01); *G06F 11/364* (2013.01)

(58) Field of Classification Search
CPC .................................................. G06F 11/3664
USPC ........................................................ 717/128
See application file for complete search history.

(56) References Cited

U.S. PATENT DOCUMENTS

| 7,487,396 | B2 * | 2/2009 | Cheng ..................... G06F 11/36 703/21 |
| 7,516,443 | B2 * | 4/2009 | Creamer ............. G06F 11/3688 709/201 |
| 7,712,087 | B2 * | 5/2010 | Kogan ................ G06F 11/3672 717/128 |
| 7,770,074 | B2 * | 8/2010 | Kaefer .................. G06F 11/076 714/38.14 |
| 7,882,495 | B2 * | 2/2011 | Tillmann ............ G06F 11/3688 717/124 |
| 9,032,371 | B2 | 5/2015 | Hansson |

(Continued)

OTHER PUBLICATIONS

Ren et al., "Identifying Failure Causes in Java Programs: An Application of Change Impact Analysis", IEEE Transactions on Software Engineering, vol. 32, No. 9, Sep. 2006 (pp. 718-732).

(Continued)

*Primary Examiner* — Evral E Bodden
(74) *Attorney, Agent, or Firm* — William Kinnaman, Esq.; Kevin P. Radigan, Esq.; Heslin Rothenberg Farley & Mesiti P.C.

(57) ABSTRACT

Method and system are provided for automated system testing in a complex software environment. The method includes: collecting data during a test run of a product under test that involves multiple systems and resources where a test run introduces one or more product code change sets, the collected data including a product trace of the execution of the product under test at a product code level; and storing the last good collected data. Based on the test failing, comparing a current product trace with a last good product trace; determining a difference between the current and last good traces and identifying a failing product program referenced in the product trace; looking through the introduced product code change sets to determine if a code change is found for the failing program indicating that the error is likely to be in the code change set, and generating an appropriate defect prompt.

17 Claims, 11 Drawing Sheets

(56) References Cited

U.S. PATENT DOCUMENTS

| | | |
|---|---|---|
| 9,262,851 B2 * | 2/2016 | Sridharan ................ G06F 8/34 |
| 9,348,725 B1 | 5/2016 | Cohen et al. |
| 2008/0222501 A1 | 9/2008 | Travison et al. |
| 2013/0036405 A1 | 2/2013 | Verbest |
| 2014/0109051 A1 * | 4/2014 | McDonald ................ G06F 8/30 |
| | | 717/124 |
| 2014/0109053 A1 | 4/2014 | Vasudevan et al. |

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.

\* cited by examiner

AUTOMATED SYSTEM TESTING IN A COMPLEX SOFTWARE ENVIRONMENT

BACKGROUND

The present invention relates to automated system testing, and more specifically, to automated system testing in a complex software environment.

In a product development environment, large numbers of automated tests are executed and results are checked against expected results in order to ensure new code delivered for the product has not caused any regressions or injected new problems. These tests are run repeatedly for every build of the product code.

The test framework for these tests is often very complex, where the test itself involves a complex scenario such as setting up the test artifacts and going through multiple steps of transaction processing in systems. For example, the test framework may start one or multiple product systems, define the resources in the systems, look up a user identifier and password from the framework and then use this to log on to the systems and then start a transaction that starts subsequent processing within the product system(s).

When such a test fails, it is often very time consuming and difficult to work out where the failure is and what the cause is. The output from the systems under test, e.g. messages, trace, dump etc., has to be examined by product experts and test experts in order to work out whether the problem is with the system(s) under test or with the test framework itself. This can be a slow process and can result in significant delays in executing further tests with a concomitant impact on the ability of development organization to deliver further code.

SUMMARY

According to an aspect of the present invention there is provided a computer-implemented method for automated system testing in a complex software environment, including: collecting data during a test run of a product under test that involves multiple systems and resources, wherein the test run introduces one or more product code change sets, and wherein the collected data includes a product trace of the execution of the product under test at a product code level; storing last good collected data for the product under test; based on the test run failing, comparing a current product trace with a last good product trace; determining a difference between the current product trace and the last good product trace and identifying a failing product program referenced in the product trace; looking through the introduced product code change sets to determine if a code change is found for the failing program indicating that the error is likely to be in the code change set; and generating an appropriate defect prompt.

According to another aspect of the present invention there is provided a system for automated system testing in a complex software environment. The system includes a memory, and a processor communicatively coupled to the memory, wherein the system performs a method including: collecting data during a test run of a product under test that involves multiple systems and resources, wherein the test run introduces one or more product code change sets; and wherein the collected data includes a product trace of the execution of the product under test at a product code level; storing last good collected data for the product under test; based on the test run failing, comparing a current product trace with a last good product trace; determining a difference between the current product trace and the last good product trace, and identifying a failing product program referenced in the product trace; looking through the introduced product code change sets to determine if a code change is found for the failing program, indicating that the error is likely to be in the code change set; and generating an appropriate defect prompt.

According to a further aspect of the present invention there is provided a computer program product for automated system testing in a complex software environment, the computer program product including a computer readable storage medium having program instructions embodied therewith, the program instructions executable by a processor to cause the processor to: collect data during a test run of a product under test that involves multiple systems and resources, wherein the test run introduces one or more product code change sets, and wherein the collected data includes a product trace of the execution of the product under test at a product code level; store the last good collected data for the product under test; based on the test run failing, compare a current product trace with a last good product trace; determine a difference between the current product trace and the last good product trace and identifying a failing product program referenced in the product trace; look through the introduced product code change sets to determine if a code change is found for the failing program indicating that the error is likely to be in the code change set; and generate an appropriate defect prompt.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention are described below, by way of example only, with reference to the drawings, in which.

Figure 1:
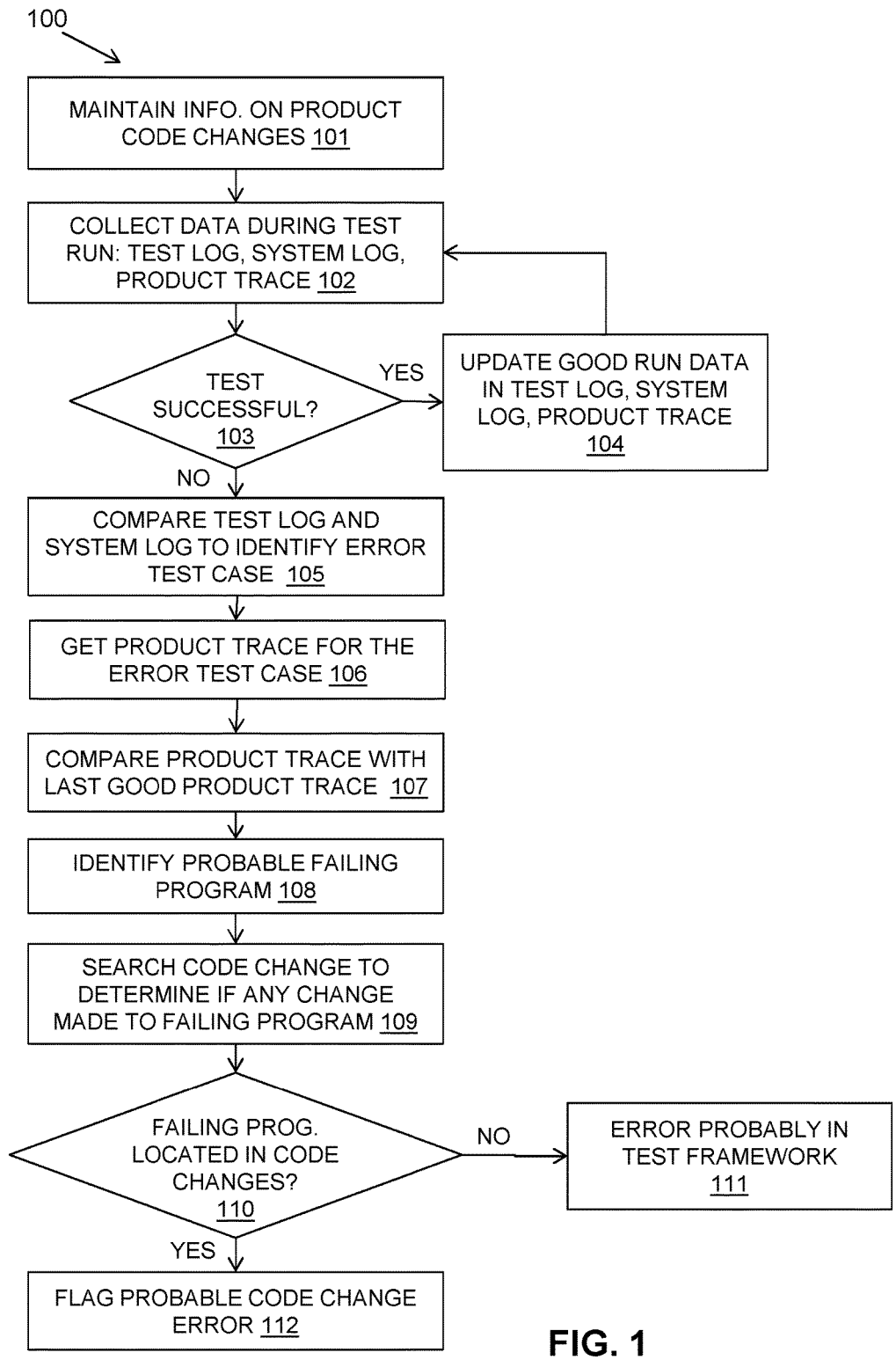
FIG. 1 is a flow diagram of one embodiment of an aspect of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features

DETAILED DESCRIPTION

A method and a system are provided which aid diagnosis of the source of a problem arising from a test execution in a complex software environment. The method and system provide an indication of the location of the problem in either the product under test or the test framework thus enabling the appropriate experts to fix the problem.

An analyzer component is provided for carrying out the described method, which may be provided in a testing environment with access to a collection of data logs. The analyzer component has analytic capabilities which are capable of determining whether a problem causing a test failure is in the test framework or in the system(s) under test by comparing a successful test execution with a failing one. If it is determined that the problem is in the system(s) under test, then the analytic capabilities may determine whether it is due to the code changes in the current build run.

The method uses data logs for a test execution of a product in a complex software environment in the form of: a test log of events and data relating to the test execution; a system log of events and data relating to the various systems and resources involved in the product execution; and a product trace of the test execution.

A system log typically consists of messages issued by the system as part of normal execution. It may give details of configuration options, start-up options, etc. It may also provide error messages when a problem is detected.

A product trace is a diagnostic tool. It generates a special type of file that can be formatted by a trace formatting tool. It contains detailed information concerning the execution of the product under test, such as indicating which programs are being invoked and what parameters they are being invoked with.

The method compares the data logs from a "good" run of a test against a "current" run of a test. If the current run is successful, the updater component refreshes the test run data store with the new "good" run data as collected. This ensures that the good run data are always current.

If the current run of the test failed, then the method may determine the probable cause of the error as being either in the product under test or in the test framework being used to implement the test. When the error is with the test framework, for example, it could be various resources not being ready for the product under test, the error is likely to show up in the system log, the test log as well as the product trace.

By comparing a current product trace with the last good product trace, the method may determine the failing product program. The method may access the source code repository and search for recent changes to the program or programs causing the error. If there is no code change made to the failing product program, then the error is likely to be in the test framework. If a code change is found for the failing program, then the error is likely to be in a change set. The method may automatically raise a defect in the product defect tracking system and assign it to the appropriate expert. This enables the correct product expert to be alerted to the problem.

Over time, the analyzer component may learn from past results of analysis and so improve the confidence in the problem analysis.

Using the resolution codes on defects raised by the analyzer component itself, the analyzer component may determine whether the diagnosis was correctly made for that particular circumstance. If correct, increased weighting may be given to the same or similar diagnoses in future test case failures. If not correct, decreased weighting can be given to the symptoms used for the incorrect diagnosis in future occurrences of the same or similar problems. Over time, the analyzer component may build up a mapping of commonly observed symptoms and correct diagnoses of the problem areas. This will enable the analyzer component to give diagnoses that are increasingly reliable as time passes.

Referring to FIG. 1, a flow diagram 100 shows an example embodiment of the described method as carried out at an analyzer component in a test environment wherein a product is under test in a complex software environment.

The method may maintain 101 information on the product code changes in the product under test.

The test may be run and data logs collected 102 in the form of a test log, a system log, and a product trace. It may be determined 103 if the test was successful, for example, by detecting an error in the test log or the system log. If the test was successful, then the good run data is updated 104 in the data logs of the test log, system log, and product trace.

If the test was not successful, then a comparison of a good run with a bad run provides a diagnosis of what the problem is. If the test was not successful, the system log and the test log may be compared 105 to the last good run system log and test log. It may be determined if the system logs differ and thereby identify an error test case.

The product trace for the error test case may be obtained 106 and may be compared 107 to the last good product trace to identify 108 the probable failing program or programs.

The code changes may be searched 109 to determine if there is any change in the failing program. It may be determined 110 if a code change is found for the failing program indicating that the error is likely to be in the code change set.

If the failing program is not found in the code changes, then the error may be considered 111 to be likely to be in the test framework and the method may automatically raise a defect in the product defect tracking system and assign it to the appropriate expert.

If the failing program is located in the code changes, the probable code change may then be flagged 112 and the method may automatically raise a defect in the product defect tracking system and assign it to the appropriate expert.

According to an aspect of the present invention, a system is provided for automated system testing in a complex software environment, including: a processor and a memory configured to provide computer program instructions to the processor to execute the function of the components; a collector component for collecting data during a test run of a product under test that involves multiple systems and resources wherein a test run introduces one or more product code change sets, wherein the collected data includes a product trace of the execution of the product under test at a product code level; an updater component for storing the last good collected data for the product under test in a test result store; an analyzer component for, if the test run fails, comparing a current product trace with a last good product trace, and including: a product trace comparing component for determining a difference between the current product trace and the last good product trace and identifying a failing product program referenced in the product trace; and a code change component for looking through the introduced product code change sets to determine if a code change is found for the failing program indicating that the error is likely to be in the code change set; and a defect prompt component for generating an appropriate defect prompt.

Figure 2:
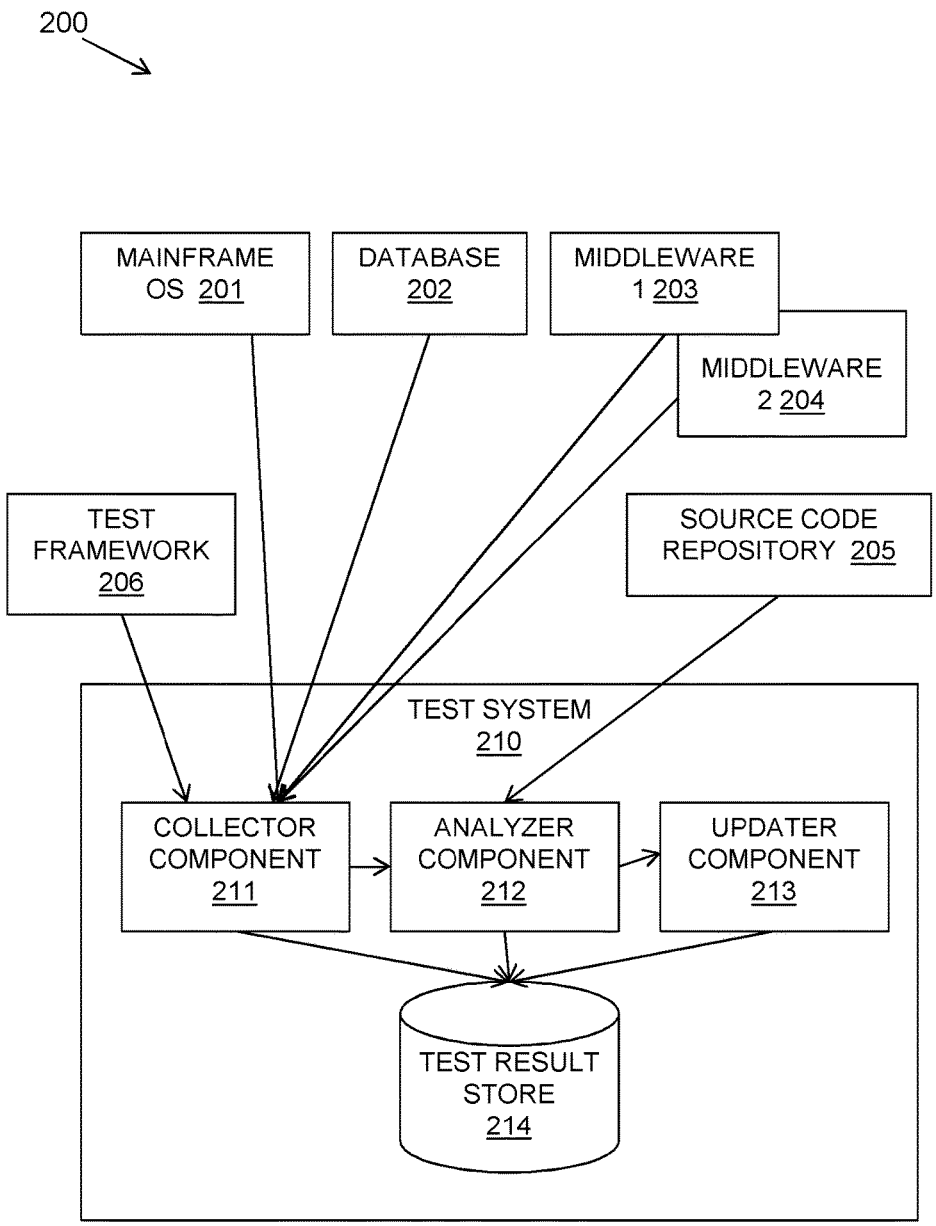
FIG. 2 is a block diagram of one example embodiment of a system, in accordance with one or more aspects of the present invention.

Referring to FIG. 2, a block diagram 200 shows one embodiment of the described system. As noted, a test system 210 in a software test environment for diagnosing the source of test case failure may include a collector component 211, an analyzer component 212, an updater component 213, and test result store 214.

The collector component 211 may collect several sources of information resulting from a run of each test in a test suite. The collector component 211 may collect system log data from systems and resources in which the test is run. For example, the system log data may include: the job logs of one or more systems under test such as middleware 203, 204; job logs from other connected systems, for example, databases 202; and operating system logs, for example, from a mainframe operating system 201. These logs may contain data in chronological order.

In addition, the collector component 211 may collect a product trace of the test at the product code level.

The collector component 211 may also collect test log data from the test framework 206 such as the test framework level, logs or response codes from each test.

Following every run, the collector component 211 may record the results of the test log, system log, and product trace into the test result store 214.

The analyzer component 212 may analyze the new logs and trace and, if the test was successful, the updater component 213 may then update the test result store 214 by replacing the older data with the new data. This enables easy maintenance of the successful run data for the automated tests when product changes are incorporated.

Figure 3:
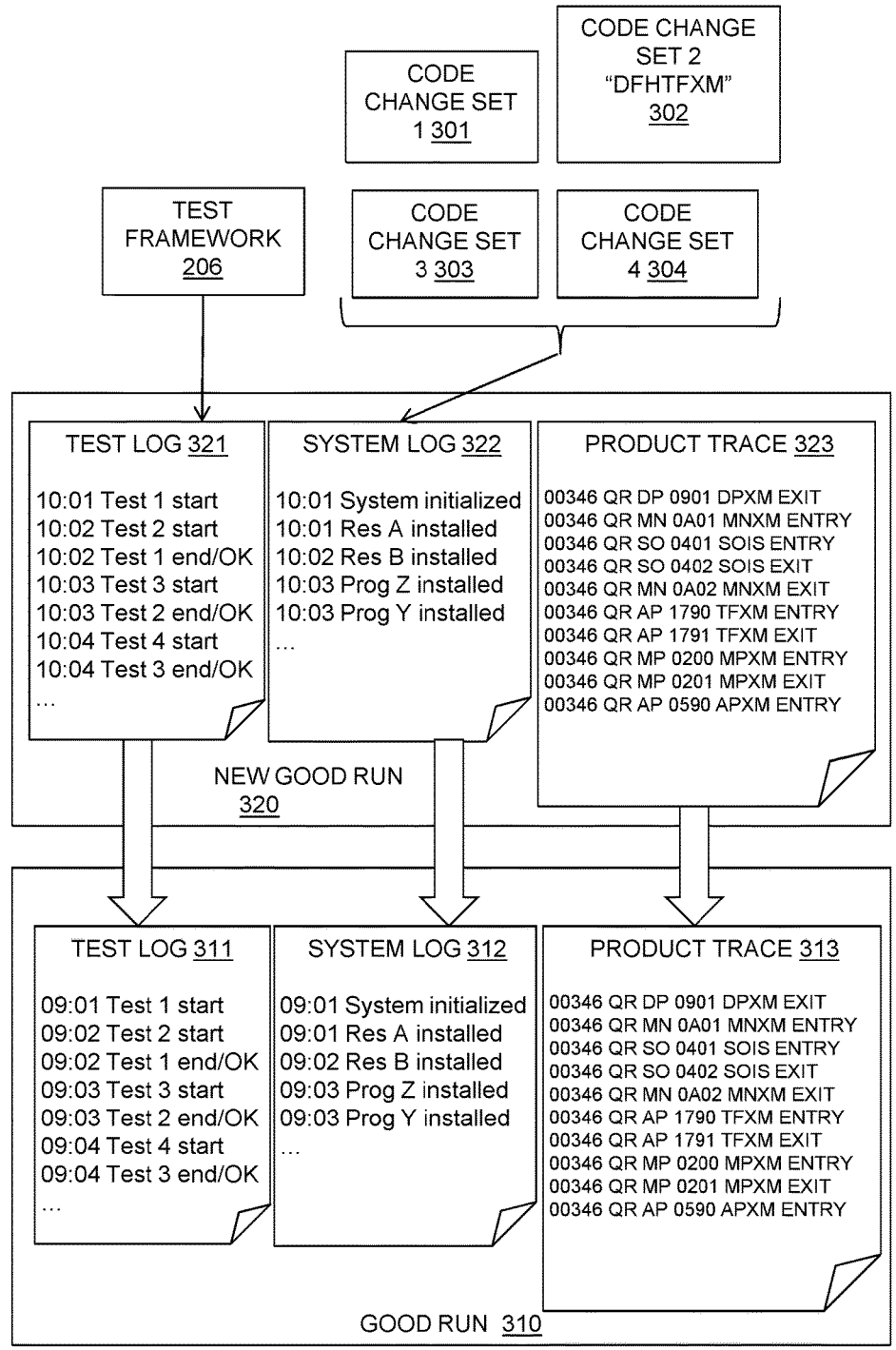
FIG. 3 is a schematic diagram illustrating data logs used by a method, in accordance with one or more aspects of the present invention.

FIG. 3 shows a schematic diagram 300 in which a data from a good run 310 is stored in the test result store 214 in the form of a test log 311, a system log 312, and a product trace 313. A new good run 320 collects data of a test log 321 from the test framework 206, and a system log 322 and a product trace 323 from the system components involved in the product test. In this example, there are four code change sets 301-304 including code change set 2 302 which changes "DFHTFXM".

The data of the stored good run 310 is refreshed with the new test log 321, system log 322, and product trace 323 of the new good run 320.

When the test fails, the analyzer component 212 will may compare the data from the last successful run with the failing run and attempt to diagnose whether the problem is with the test framework or with the product under test. Based on the diagnostics, the analyzer component 212 may locate the probable place as described in the flow diagram 100 of FIG. 1. It should be noted that a difference in task numbers in the product trace 323 does not indicate a problem as they may be different between test runs.

Two scenarios are now considered for illustration, one where the problem is with the product code and one where the problem is in the test framework.

Scenario 1: The Problem is with Code Changes in the Product.

Figure 4A:
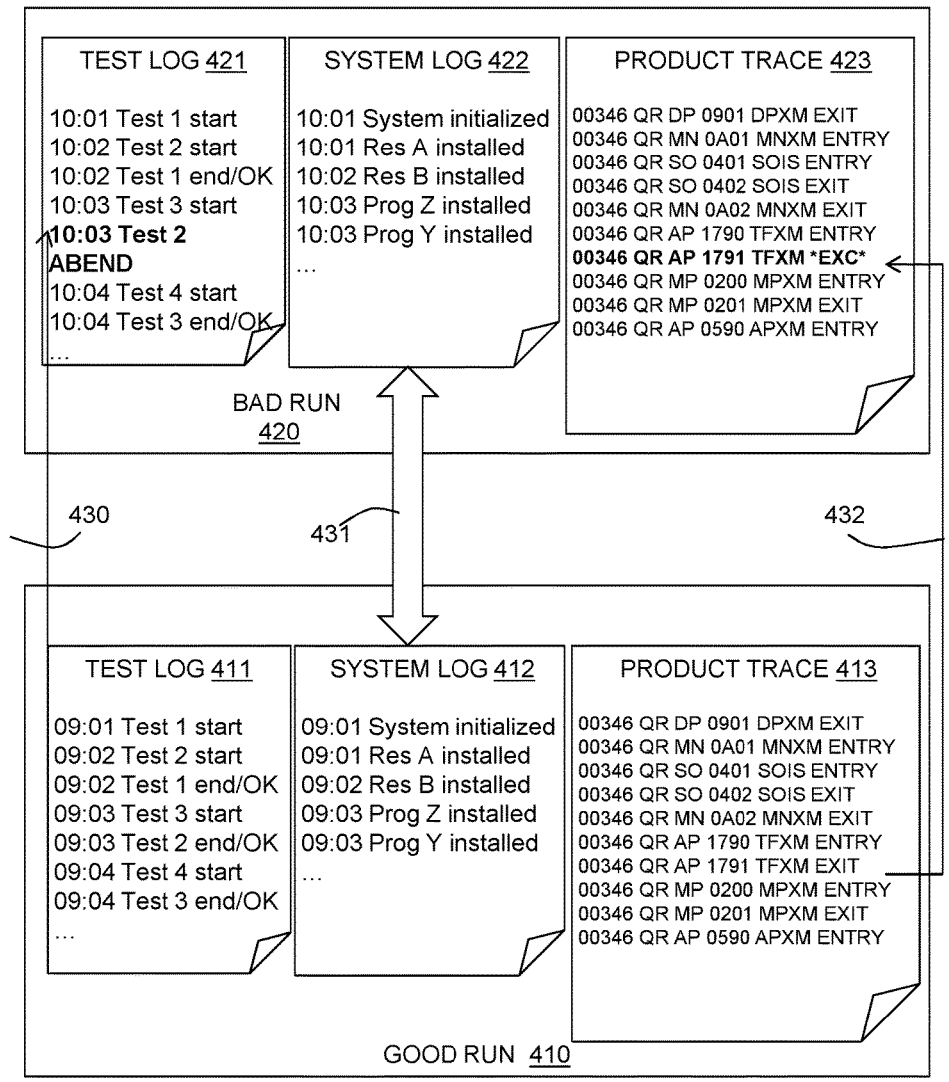
FIGS. 4A and 4B are schematic diagrams illustrating data logs used with an embodiment of a first example scenario, in accordance with one or more aspects of the present invention.
Figure 4B:
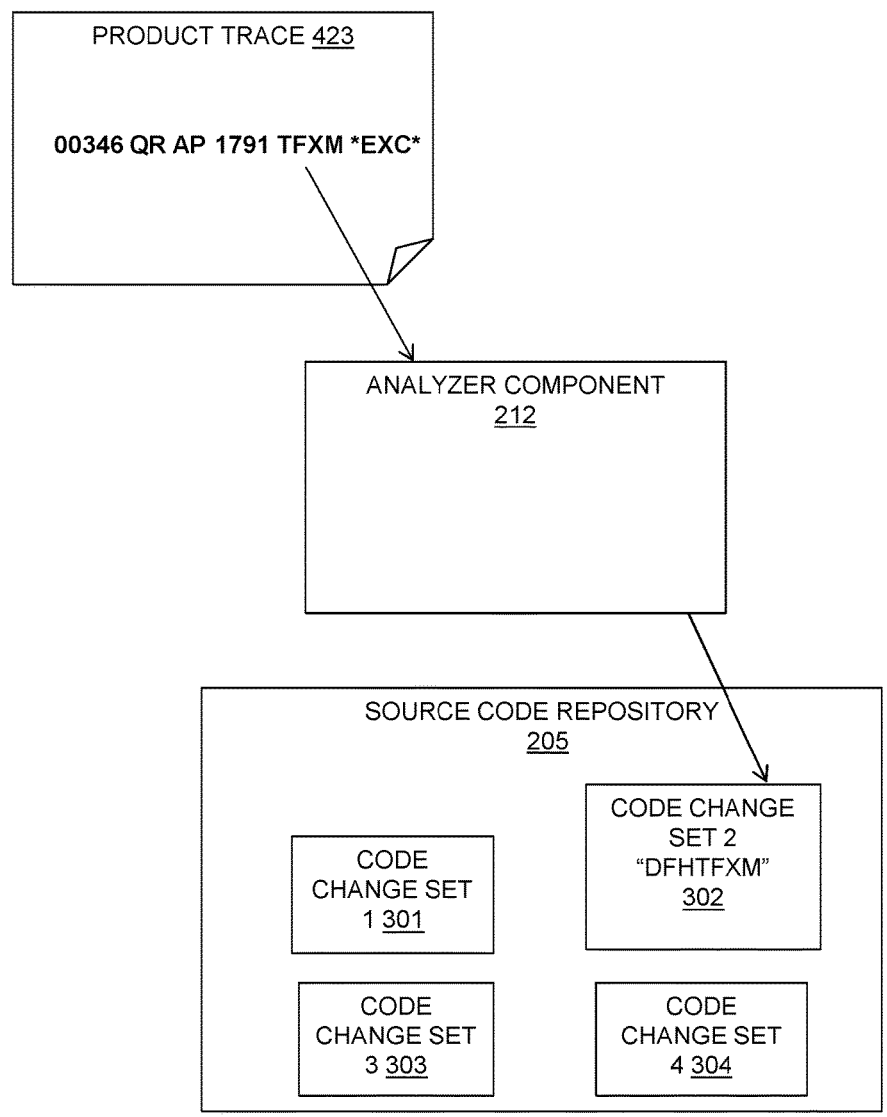

Identification of the problem in Scenario 1 is illustrated schematically in FIGS. 4A and 4B. FIG. 4A shows a bad run 420 with a test log 421, system log 422, and product trace 423 and the last good run 410 with a test log 411, system log 412, and product trace 413. The test log 421 shows that Test 2 has failed with an abnormal end "abend" 430. The system log 422 of the bad run 420 is compared 431 to the system log 412 of the stored good run 410 and no difference is detected. By comparing the product trace 423 of the bad run 420 to the product trace 413 of the stored good run 410 a difference 432 is detected.

Referring to FIG. 4B, the analyzer component 212 may detect from the test log 421 that Test 2 has failed with an abend. By comparing the product trace 423, the first difference can be detected "00346 QR 1791 TFXM *EXC*". It may be possible further to identify whether a code change has caused the problem. By examining the first difference in the trace outputs when comparing "good" and "bad" runs, a diagnosis of the probable failing program can be made, in this case, "TFXM".

If the failing program is known, it is then possible for the analyzer component 212 to indicate which code change has introduced the problem. This is illustrated in FIG. 4B. The analyzer component 212 may search through the code changes and determine which one changed "TFXM", in this case code change set 2 302. This may be flagged by the system as the probable cause of the error, and the owner of the change set may be informed to correct the problem.

Scenario 2: The Problem is with the Test Framework.

When the error is with the test framework, for example, it could be various resources not being ready for the product under test, the error is likely to be indicated in the test log and the system log.

Figure 5A:
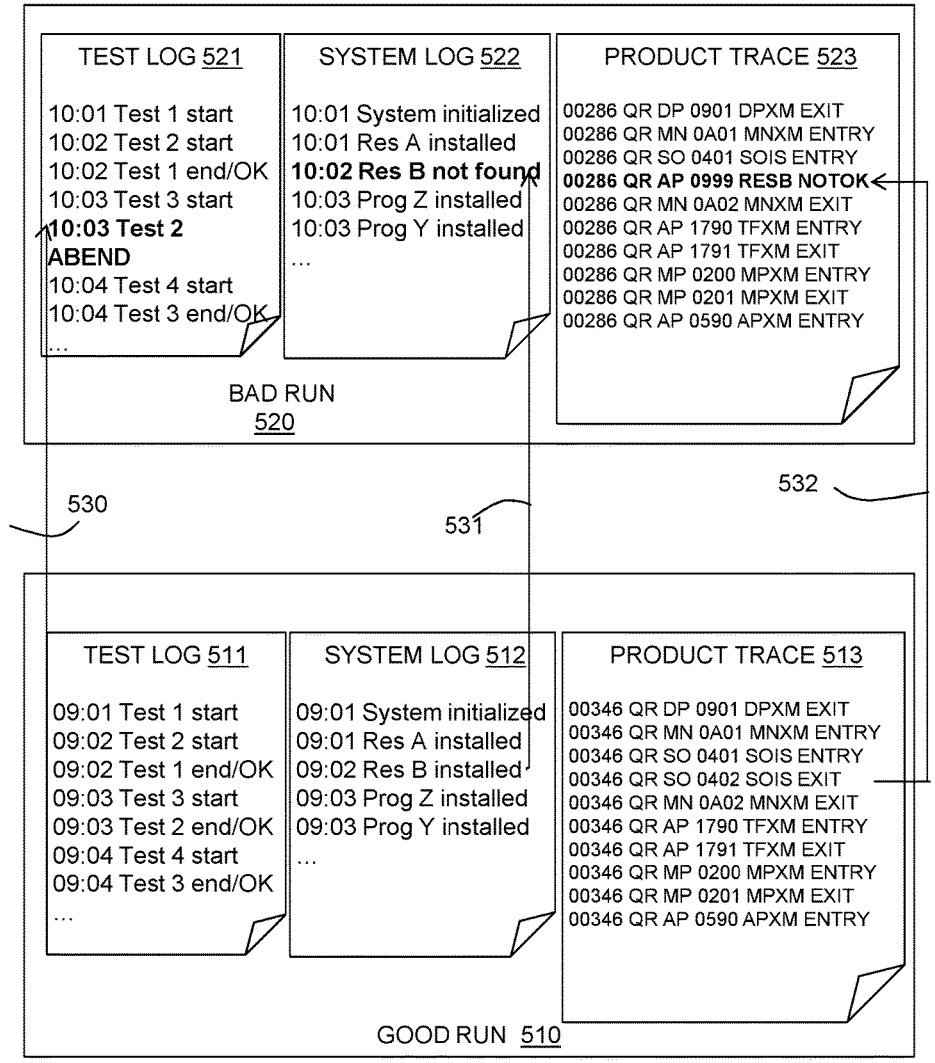
FIGS. 5A and 5B are schematic diagrams illustrating the data logs used with an embodiment of a second example scenario, in accordance with one or more aspects of the present invention.
Figure 5B:
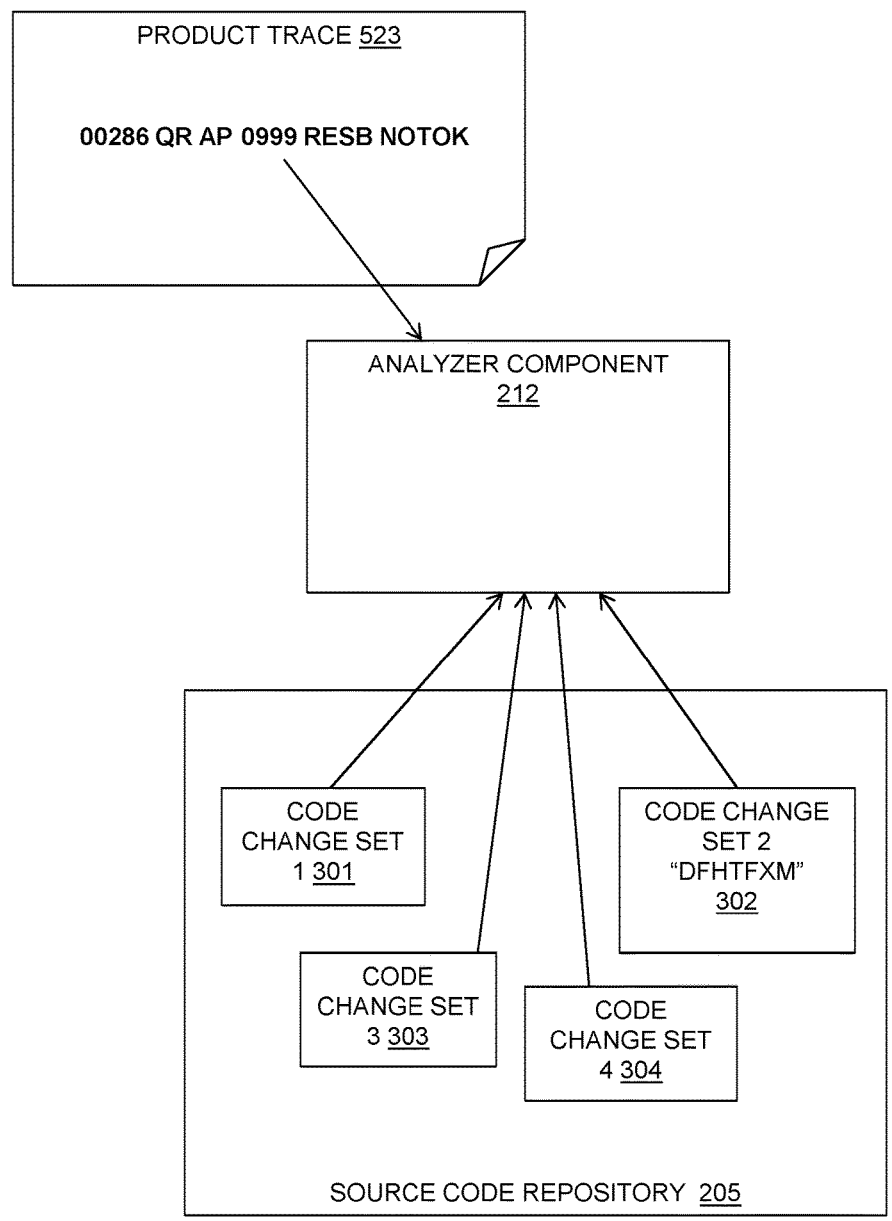

Identification of the problem in Scenario 2 is illustrated schematically in FIGS. 5A and 5B. FIG. 5A shows a bad run 520 with a test log 521, system log 522, and product trace 523 and the last good run 510 with a test log 511, system log 512, and product trace 513.

The test log 521 shows that Test 2 has failed with an abend 530. The system log 522 of the bad run 520 is compared 531 to the system log 512 of the stored good run 510 and a difference is detected 531.

The analyzer component 212 may compare the system logs 522, 512 and find out the error in the system log. The analyzer component 212 may identify the difference 532 in the product trace 523 "00286 QR AP 0999 RESB NOTOK". The analyzer component 212 may detect the difference in "Resource B" and determine if there are any changes in Resource B. As there were no changes to Resource B, it is probably a test framework error. It is likely that the analyzer component 212 will not find a code change to the product module that raised the error. The analyzer component 212 may be able to indicate that the problem in this case is likely to be with the test framework and raise a flag for it so that the test expert can investigate and correct the problem.

With the automated problem determination and identification of the probable location, the system can save a lot of manual effort and time and leave the expert to focus on fixing the error.

By using this system, it can save a lot of time by identifying the probable location of the problem therefore speeding up progress.

Figure 6:
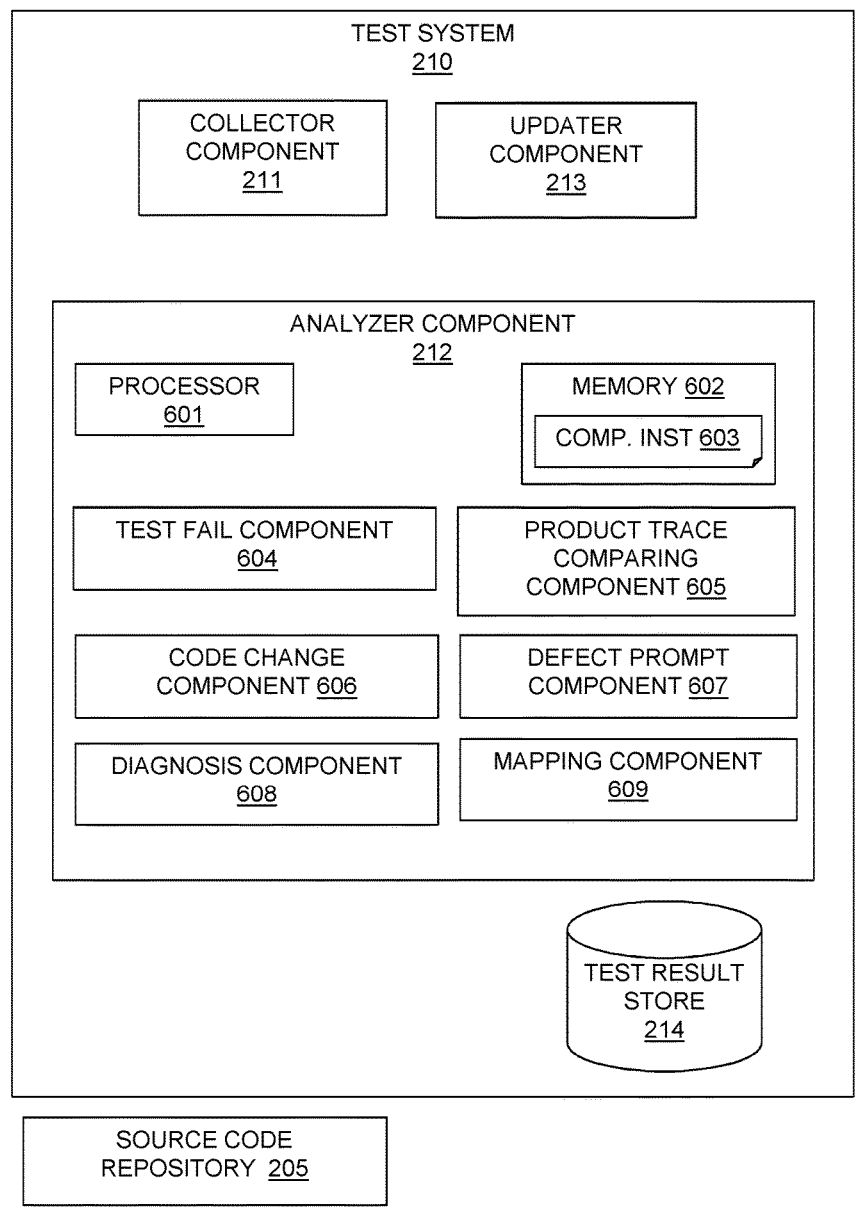
FIG. 6 is a block diagram of an embodiment of a system, in accordance with one or more aspects of the present invention.

Referring to FIG. 6, a block diagram shows an example embodiment of the test system 210 of FIG. 2.

The test system 210 may include a collector component 211 for collecting data during a test run of a product under test that involves multiple systems and resources. The collected data may include: a system log of events of the systems and resources; a test log of events in the test run; and a product trace of the product at a product code level.

The test system 210 may include an updater component 213 for storing a last good version of the collected data for the product under test in a test result store 214.

The analyzer component 212 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be conFIG.d to provide computer instructions 603 to the at least one processor 601 to carry out the functionality of the components.

The analyzer component 212 may include a test fail component 604 for determining if a test fails by detecting an error in the test log or the system log. This may be determined by comparing to a last good run of the test log and system log.

The analyzer component 212 may include a product trace comparing component 605 and a code change component 606

The product trace comparing component 605 may compare a current product trace with a stored last good product trace of the product under test, and may use the difference in the product trace to identify a probable failing program or programs.

A source code repository 205 may be provided in conjunction with the test system 210 for maintaining information on the product code changes in the test run. The code change component 606 may use the identified probable failing program to search the source code repository 205 for recent code changes to the program to determine a probable error.

The code change component 606 determines if a code change is found for the failing program indicating that the error is likely to be in the code change set. The code change component 606 may determine if there is no code change made to the failing product program indicating that the error is likely to be in the test framework.

The analyzer component 212 may further include a defect prompt component 607 for generating an appropriate defect prompt. The defect prompt component 607 may automatically raise a defect in a product defect tracking system and assigns it to the appropriate expert.

The analyzer component 212 may also include a diagnosis component 608 for using resolution codes on defects raised in the test runs to determine whether a diagnosis has been correctly made and weighting the diagnosis based on collected data for future test cases.

The analyzer component 212 may also include a mapping component 609 for building a mapping of observed data outputs of the collected data and correct diagnoses of problem areas.

Figure 7:
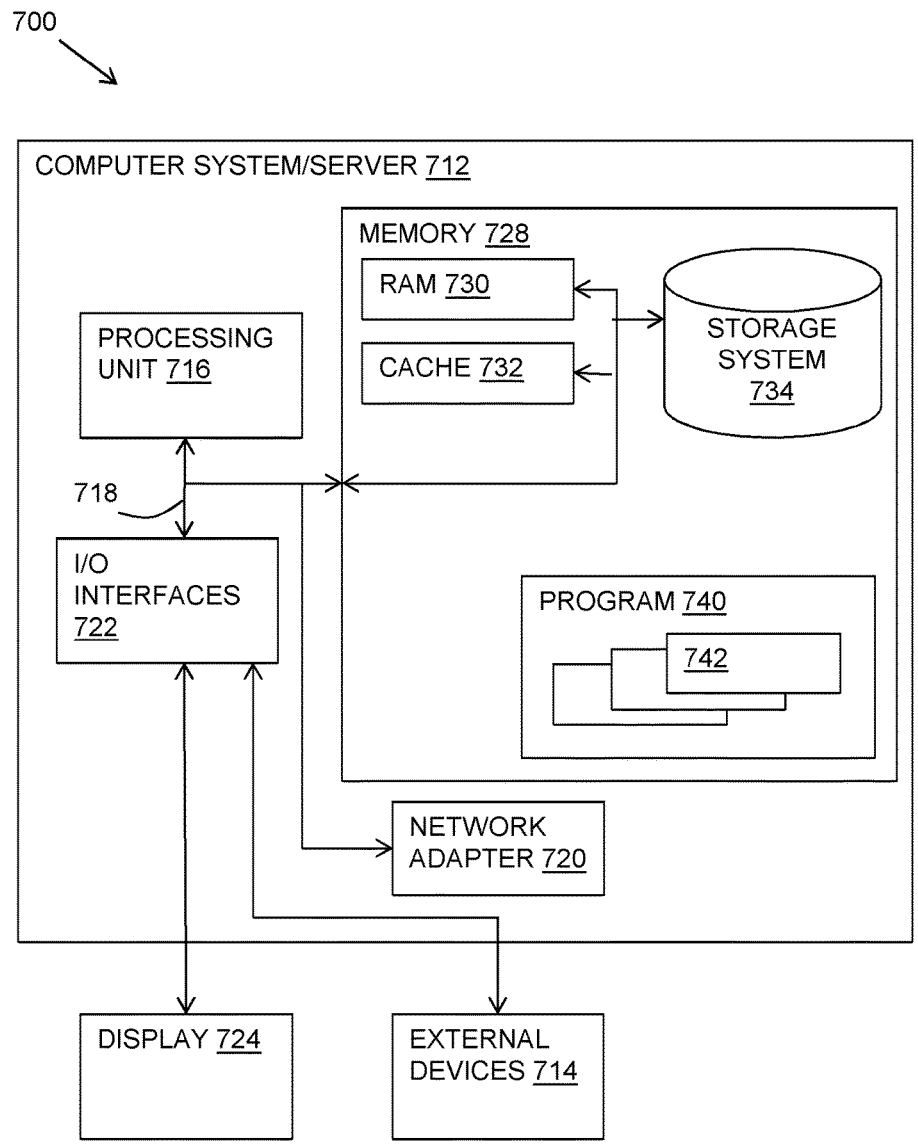
FIG. 7 is a block diagram of an embodiment of a computer system or cloud server in which the present invention may be implemented.

Referring now to FIG. 7, a schematic of an example of a system 700 in the form of a computer system or a server is shown.

A computer system or server 712 may be operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

In FIG. 7, a computer system/server 712 is shown in the form of a general-purpose computing device. The components of the computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
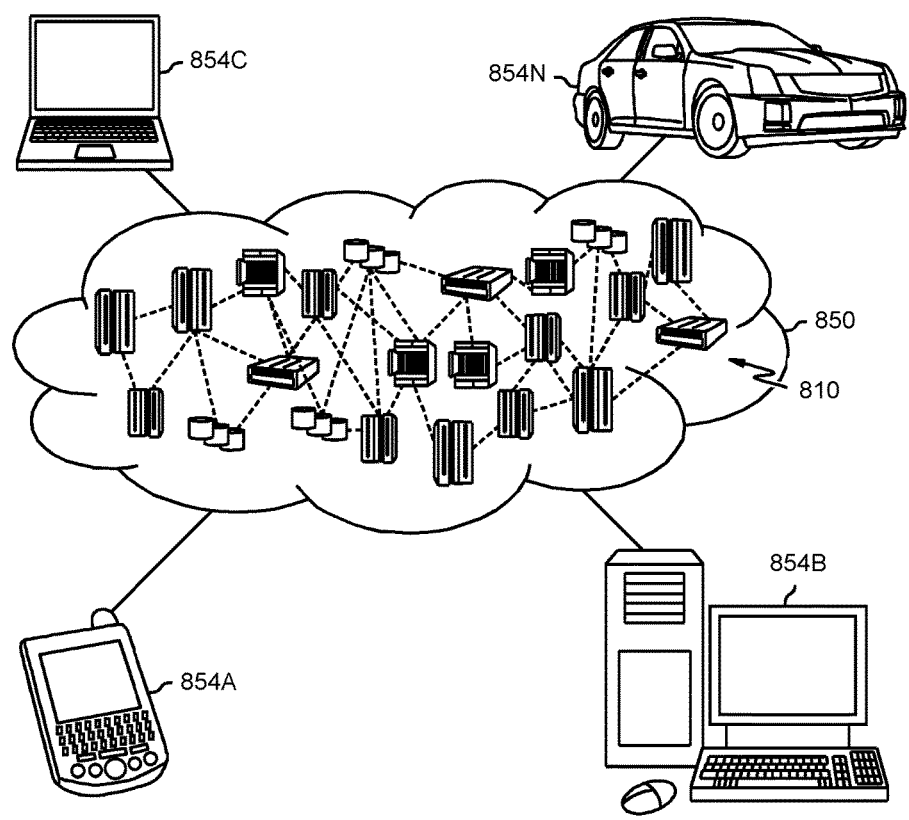
FIG. 8 is a schematic diagram of a cloud computing environment in which the present invention may be implemented.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
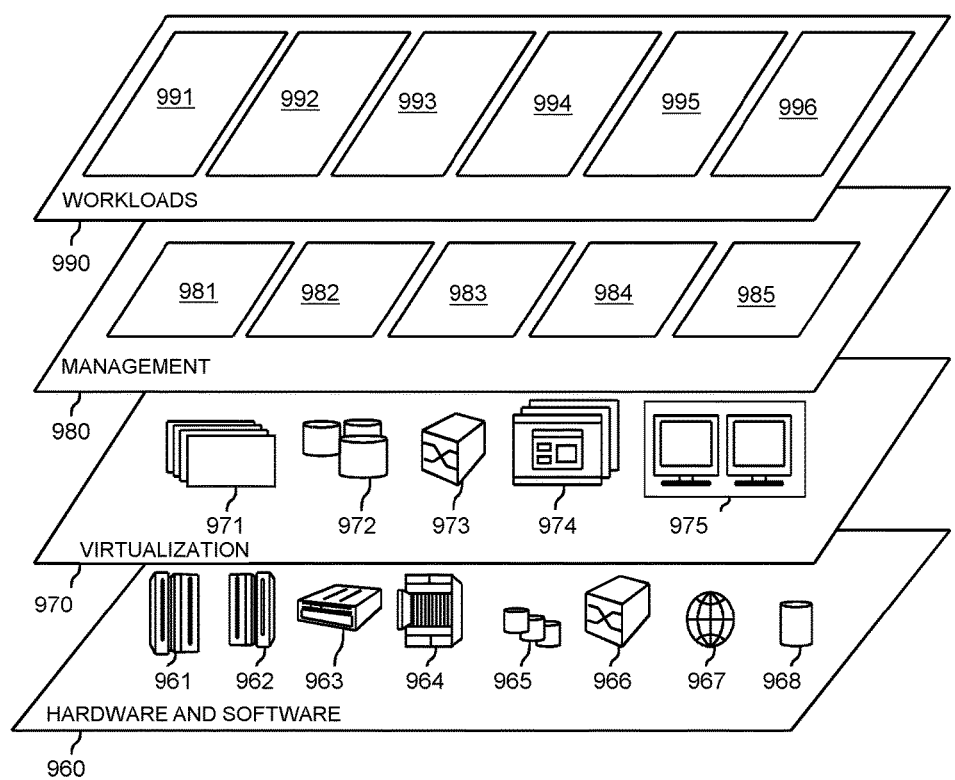
FIG. 9 is a diagram of abstraction model layers of a cloud computing environment in which the present invention may be implemented.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and software testing analysis 996.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for automated system testing in a complex software environment, comprising:
    obtaining one or more product code change sets for a product under test to run in the complex software environment, the one or more product code change sets comprising one or more code changes to one or more programs of the product under test;
    collecting data during a test run of the product under test that involves multiple systems and resources, wherein the test run introduces the one or more product code change sets to the product under test, and wherein the collected data includes a product trace of the execution of the product under test at a product code level collected during the test run, the product trace indicating which programs are being invoked and what parameters the programs are being invoked with, and the collected data further includes system log data from the multiple systems and resources in which the test is run, and a test log of events and data relating to test execution;
    storing last good collected data for the product under test, including a last good product trace;
    based on the test run failing, comparing the test log and the system log data to identify an error test case;
    obtaining a current product trace for the error test case;
    based also on the test run failing, automatically determining whether the test run failing is likely related to the one or more product code change sets or to a test framework error, the automatically determining comprising:
        comparing the current product trace for the error test case with the last good product trace;
        determining a difference between the current product trace and the last good product trace and identifying a failing product program referenced in the current product trace;
        determining whether a code change of the one or more product code changes is found for the failing product program, and if so, indicating that the error is likely to be in the code change set, and if not, indicating that the error is likely in the test framework; and
    generating an appropriate defect prompt based, at least in part, on the automatically determining.

2. The method as claimed in claim 1, wherein the method includes:
    determining if a test fails by the test framework error by detecting an error in the test log or the system log.

3. The method as claimed in claim 2, further including identifying the error test case and obtaining the current product trace for the error test case.

4. The method as claimed in claim 1, further including maintaining information on introduced product code change sets.

5. The method as claimed in claim 1, wherein generating the appropriate defect prompt automatically raises a defect in a product defect tracking system and assigns it to the appropriate expert.

6. The method as claimed in claim 1, wherein the multiple systems and resources involved in the product under test include one or more of the group of: servers, mainframes, databases, middleware, and software.

7. The method as claimed in claim 1, further including using resolution codes on defects raised in the test runs to determine whether a diagnosis was correctly made and weighting the diagnosis based on collected data for future test cases.

8. The method as claimed in claim 1, further including building a mapping of observed data outputs of the collected data and correct diagnoses of problem areas.

9. The method as claimed in claim 1, wherein the method is provided as a service in a cloud environment.

10. A system for automated system testing in a complex software environment, comprising:
   a memory; and
   a processor communicatively coupled with the memory to perform a method comprising:
      obtaining one or more product code change sets for a product under test to run in the complex software environment, the one or more product code change sets comprising one or more code changes to one or more programs of the product under test;
      collecting data during a test run of the product under test that involves multiple systems and resources, wherein the test run introduces the one or more product code change sets to the product under test, and wherein the collected data includes a product trace of the execution of the product under test at a product code level collected during the test run, the product trace indicating which programs are being invoked and what parameters the programs are being invoked with, and the collected data further includes system log data from the multiple systems and resources in which the test is run, and a test log of events and data relating to test execution;
      storing last good collected data for the product under test, including a last good product trace;
      based on the test run failing, comparing the test log and the system log data to identify an error test case;
      obtaining a current product trace for the error test case;
      based also on the test run failing, automatically determining whether the test run failing is likely related to the one or more product code change sets or to a test framework error, the automatically determining comprising:
         comparing the current product trace for the error test case with the last good product trace;
         determining a difference between the current product trace and the last good product trace and identifying a failing product program referenced in the current product trace;
         determining whether a code change of the one or more product code changes is found for the failing product program, and if so, indicating that the error is likely to be in the code change set, and if not, indicating that the error is likely in the test framework; and
      generating an appropriate defect prompt based, at least in part, on the automatically determining.

11. The system as claimed in claim 10, wherein the method includes:
   determining if a test fails by the test framework error by detecting an error in the test log or the system log.

12. The system as claimed in claim 11, further including identifying the error test case and obtaining the current product trace for the error test case.

13. The system as claimed in claim 10, further including maintaining information on the product code changes in the test run.

14. The system as claimed in claim 10, wherein generating the appropriate defect automatically raises a defect in a product defect tracking system and assigns it to the appropriate expert.

15. The system as claimed in claim 10, further including using resolution codes on defects raised in the test runs to determine whether a diagnosis was correctly made and weighting the diagnosis based on collected data for future test cases.

16. The system as claimed in claim 10, further including building a mapping of observed data outputs of the collected data and correct diagnoses of problem areas.

17. A computer program product for automated system testing in a complex software environment, the computer program product comprising a computer readable storage medium having program instructions embodied therewith, the program instructions executable by a processor to cause the processor to:
   obtain one or more product code change sets for a product under test to run in the complex software environment, the one or more product code change sets comprising one or more code changes to one or more programs of the product under test;
   collect data during a test run of the product under test that involves multiple systems and resources, wherein the test run introduces the one or more product code change sets to the product under test, and wherein the collected data includes a product trace of the execution of the product under test at a product code level collected during the test run, the product trace indicating which programs are being invoked and what parameters the programs are being invoked with, and the collected data further includes system log data from the multiple systems and resources in which the test is run, and a test log of events and data relating to test execution;
   store last good collected data for the product under test, including a last good product trace;
   based on the test run failing, compare the test log and the system log data to identify an error test case;
   obtain a current product trace for the error test case;
   based also on the test run failing, automatically determine whether the test run failing is likely related to the one or more product code change sets or to a test framework error, the automatically determining comprising:
      comparing the current product trace for the error test case with the last good product trace;
      determining a difference between the current product trace and the last good product trace and identifying a failing product program referenced in the current product trace;
      determining whether a code change of the one or more product code changes is found for the failing product program, and if so, indicating that the error is likely to be in the code change set, and if not, indicating that the error is likely in the test framework; and
   generating an appropriate defect prompt based, at least in part, on the automatically determining.

* * * * *